(12) United States Patent
Choi et al.

(10) Patent No.: US 9,771,527 B2
(45) Date of Patent: Sep. 26, 2017

(54) PRODUCTION OF UPGRADED PETROLEUM BY SUPERCRITICAL WATER

(71) Applicant: SAUDI ARABIAN OIL COMPANY, Dhahran (SA)

(72) Inventors: Ki-Hyouk Choi, Dhahran (SA); Joo-Hyeong Lee, Ras Tanura (SA); Mohammad S. Garhoush, Damman (SA); Ali H. Alshareef, Qatif (SA)

(73) Assignee: SAUDI ARABIAN OIL COMPANY (SA)

( * ) Notice: Subject to any disclaimer, the term of this patent is extended or adjusted under 35 U.S.C. 154(b) by 820 days.

(21) Appl. No.: 14/132,226

(22) Filed: Dec. 18, 2013

(65) Prior Publication Data

US 2016/0312129 A1 Oct. 27, 2016

(51) Int. Cl.

| C10G 45/08 | (2006.01) |
|---|---|
| C10G 45/26 | (2006.01) |
| C10G 49/04 | (2006.01) |
| C10G 55/00 | (2006.01) |
| B01D 11/04 | (2006.01) |
| B01J 3/00 | (2006.01) |
| C10G 47/02 | (2006.01) |
| C10G 47/32 | (2006.01) |
| C10G 49/18 | (2006.01) |

(52) U.S. Cl.
CPC .......... *C10G 55/00* (2013.01); *B01D 11/0407* (2013.01); *B01J 3/008* (2013.01); *C10G 47/02* (2013.01); *C10G 47/32* (2013.01); *C10G 49/18* (2013.01); *C10G 2300/202* (2013.01); *C10G 2300/206* (2013.01); *C10G 2300/308* (2013.01); *C10G 2300/4006* (2013.01)

(58) Field of Classification Search
CPC ........ C10G 45/08; C10G 45/26; C10G 49/04; C10G 2300/202; C10G 2300/308
See application file for complete search history.

(56) References Cited

U.S. PATENT DOCUMENTS

| 3,505,207 A | 4/1970 | Haney et al. |
|---|---|---|
| 3,531,398 A | 9/1970 | Adams et al. |
| 3,960,706 A * | 6/1976 | McCollum ............... C10G 1/00 208/108 |
| 3,988,238 A | 10/1976 | McCollum et al. |
| 4,557,821 A | 12/1985 | Lopez et al. |
| 4,569,753 A | 2/1986 | Busch et al. |
| 6,001,243 A | 12/1999 | Eller et al. |
| 7,922,895 B2 * | 4/2011 | Banerjee ............... C10G 11/16 208/112 |
| 2009/0145805 A1 | 6/2009 | Choi |
| 2009/0159498 A1 | 6/2009 | Chinn et al. |
| 2010/0314583 A1 | 12/2010 | Banerjee |
| 2011/0049016 A1 | 3/2011 | McGrady et al. |
| 2011/0147266 A1 | 6/2011 | Choi |
| 2013/0140214 A1 | 6/2013 | Choi |

FOREIGN PATENT DOCUMENTS

| CA | 2772095 A1 | 10/2012 |
|---|---|---|
| EP | 2551012 A1 | 1/2013 |
| WO | 2011048642 A1 | 4/2011 |

OTHER PUBLICATIONS

PCT Partial International Search Report; dated Mar. 24, 2015; International Application No. PCT/US2014/069954; International File Date: Dec. 12, 2014.

* cited by examiner

*Primary Examiner* — Randy Boyer
(74) *Attorney, Agent, or Firm* — Bracewell LLP; Constance Gall Rhebergen (57) ABSTRACT

A method for upgrading a petroleum feedstock using a supercritical water petroleum upgrading system includes introducing the petroleum feedstock, water and an auxiliary feedstock. The method includes operating the system to combine the petroleum feedstock and the water to form a mixed petroleum feedstock and introducing separately and simultaneously into a lower portion of an upflowing supercritical water reactor. The auxiliary feedstock is introduced such that a portion of a fluid contained within the upflowing reactor located proximate to the bottom does not lack fluid momentum. An embodiment of the method includes operating the supercritical water petroleum upgrading system such that the upflowing reactor product fluid is introduced into an upper portion of a downflowing supercritical water reactor. The supercritical water petroleum upgrading system includes the upflowing supercritical water reactor and optionally a downflowing supercritical water reactor.

64 Claims, 3 Drawing Sheets

PRODUCTION OF UPGRADED PETROLEUM BY SUPERCRITICAL WATER

BACKGROUND OF THE INVENTION

1. Field of the Invention

The field of invention relates to a method and system for upgrading petroleum. More specifically, the field relates to a method and system that uses supercritical water to upgrade petroleum.

2. Description of the Related Art

Petroleum is an essential source of energy and petroleum-based chemicals; however, impurities in the petroleum, especially sulfur, require treatment to alleviate potential environmental impacts of consuming the petroleum. Exacerbating the problem is that a greater amount of available petroleum is heavy or sour petroleum, both of which contain greater amount of impurities which must be mitigated before use as fuels.

Traditional processes for "upgrading" the petroleum feedstock include hydrogenative and thermal methods. Hydrogenative methods, which include hydrotreating and hydrocracking, use hydrogen and a hydration catalyst to remove impurities and convert the heavy fraction in the petroleum into a light or middle-range product. The main problems with hydrogenative methods include the amount of hydrogen required and the amount of catalyst, which is relatively easy to deactivate in the presence of sulfur. Thermal methods, which include coking and visbreaking, do not require the addition of external hydrogen or catalyst to facilitate the reaction. Thermal processes do, however, produce coke as a byproduct as well as olefins and diolefins. Thermal processes are also known to be ineffective in removing sulfur and nitrogen heteroatom species.

The application of supercritical water to a petroleum feedstock is known as an effective technique for upgrading hydrocarbons and desulfurization. Although coke formation is suppressed, the supercritical water reaction conditions and residence time required to effectively upgrade the introduced petroleum feedstock can result in pre-coking and coking reactions that result in coating the reactor as well as units and attachments downstream. Increased residence time in the supercritical water reactor increases upgrading conversion and desulfurization; however, the probability of coking and overcracking the hydrocarbons into light gases and olefins also increases. It is desirable to have a method and system that exposes the heavy fraction of the petroleum feedstock to supercritical water such that the heavy fraction breaks down but minimizes the formation of pre-coking materials.

Petroleum-based coke is generated by inter-radical reactions. The inter-radical reactions produce localized dimerization, oligomerization and polymerization reactions between high-carbon hydrocarbons of the petroleum feedstock. Coking is not commonly observed in thermal upgrading treatment processes of light fractions of crude oil, including naphtha, kerosene and diesel. Although not intending to be bound by theory, it is believed that polyaromatics rings of hydrocarbons (for example, asphaltenes) stabilize free-radicals through delocalization. The delocalization effect results in the lifespan of the free-radical on the polyaromatics rings being much longer than the lifespan of a free-radical associated with paraffinic, olefinic or naphthenic compounds. The fraction of the crude oil that possesses the greatest amount of polyaromatic rings is the heavy fraction.

In addition, the hydrocarbons associated with the heavy fraction of the petroleum feedstock are not readily miscible with it even though supercritical water acts as a strong solvent towards hydrocarbons generally. It is desirable to have a system and method that blends supercritical water with the heavy fraction such that upgrading of the heavy fraction is supported.

SUMMARY OF THE INVENTION

A method for upgrading a petroleum feedstock using a supercritical water petroleum upgrading system includes the steps of introducing the petroleum feedstock, water and an auxiliary feedstock. The method includes the step of operating the system to combine the petroleum feedstock and the water to form a mixed petroleum feedstock. The method includes the step of operating the system such that the mixed petroleum feedstock and the auxiliary feedstock are introduced separately and simultaneously into a lower portion of an upflowing supercritical water reactor. The auxiliary feedstock is introduced into the upflowing reactor such that a portion of a fluid contained within the upflowing reactor located proximate to the bottom of the upflowing reactor does not lack fluid momentum. The method includes the step of operating the upflowing reactor such that the fluid contained within the upflowing reactor is maintained at a temperature equal to or greater than about the critical temperature of water, at a pressure equal to or greater than about the critical pressure of water, and is moving in a generally upwards direction. At the conditions within the upflowing reactor, supercritical water forms from the introduced water in the fluid contained within the upflowing reactor. The method includes the step of operating the upflowing reactor such that the upgraded and desulfurized petroleum product forms. The upgraded and desulfurized petroleum product is the reaction product between the introduced petroleum feedstock and the supercritical water and forms in the fluid contained within the upflowing reactor. The method includes the step of operating the system such that an upflowing reactor product fluid passes from an upper portion of the upflowing reactor. The product fluid includes the upgraded and desulfurized petroleum product. The amount of passing upflowing reactor product fluid is equivalent to the combined amount of the introduced mixed petroleum feedstock and the auxiliary feedstock. The method includes the step of operating the system such that a gas-phase hydrocarbon product, the upgraded and desulfurized petroleum product and an aqueous-phase product are separately selectively separated from the upflowing fluid.

An embodiment of the method for upgrading a petroleum feedstock using a supercritical water petroleum upgrading system includes the step of operating the supercritical water petroleum upgrading system such that the upflowing reactor product fluid is introduced into an upper portion of a downflowing supercritical water reactor. The supercritical water petroleum upgrading system in the embodiment method also includes the downflowing supercritical water reactor. The downflowing reactor is fluidly coupled downstream of the upflowing reactor and is operable to receive the upflowing reactor product fluid into an upper portion of the downflowing reactor. The embodiment of the method includes the step of operating the downflowing reactor such that a fluid contained in the downflowing reactor is maintained at a temperature and a pressure equal to or greater than the critical temperature and the critical pressure of water, respectively, and is moving in a generally downward direction. The embodiment of the method includes the step of operating the system such that a downflowing reactor product fluid passes from a lower portion of the downflowing reactor. The amount of passing downflowing reactor product fluid is equivalent to the amount of introduced upflowing reactor product fluid. In such an embodiment of the method, the step of operating the supercritical water petroleum upgrading system is such that the gas-phase hydrocarbon product, the upgraded and desulfurized petroleum product and the aqueous-phase product are produced through the separate selective separation of the downflowing reactor product fluid instead of the upflowing reactor product fluid.

The supercritical water petroleum upgrading system includes the upflowing supercritical water reactor. The upflowing reactor has a lower portion, an upper portion, and an interior defined by an enclosing shell. The upflowing reactor is operable to maintain a fluid contained within the interior at supercritical water conditions and to distribute both the mixed petroleum feedstock and the auxiliary feedstock separately into the interior of the upflowing reactor proximate to the lower portion of the upflowing reactor to facilitate upward movement of the fluid in the interior. The lower portion includes an auxiliary feedstock port and a mixed petroleum feedstock port that are separately operable to provide fluid communication between the interior and the exterior along the lower portion of the upflowing reactor. The upflowing reactor is operable to distribute the auxiliary feedstock into the lower portion of the upflowing reactor such that fluid located proximate to the lower portion of the upflowing reactor does not lack fluid momentum. The upper portion includes an outlet port that is operable to provide fluid communication between the interior and the exterior along the upper portion of the upflowing reactor. An embodiment of the system includes an internal fluid distribution device. The internal fluid distribution device fluidly couples to the auxiliary feedstock port and is operable to distribute the auxiliary feedstock into the lower portion of the upflowing reactor such that fluid located proximate to the lower portion of the upflowing reactor does not lack fluid momentum An embodiment of the supercritical water petroleum upgrading system includes a downflowing supercritical water reactor. The downflowing reactor has a lower portion, an upper portion, and an interior defined by an enclosing shell. The downflowing reactor of the embodiment is operable to maintain a fluid contained within the interior at supercritical water conditions. In the embodiment, the upper portion includes an inlet port that is operable to provide fluid communication between the interior and the exterior along the upper portion of the downflowing reactor and the lower portion includes an outlet port that is operable to provide fluid communication between the interior and the exterior along the lower portion of the downflowing reactor. The downflowing reactor of the embodiment is downstream of the upflowing reactor and the upper portion of the downflowing reactor is fluidly coupled the upper portion of the upflowing reactor.

The system useful for upgrading the petroleum feedstock includes an upflowing supercritical water reactor. The reactor and the movement of fluid within the upflowing reactor does not support the formation of solid coke in the upflowing reactor or coking pre-cursors in the produced fluid, which results in coke forming downstream of the reactor. The vertical flow nature of the upflowing reactor induces a longer residence time for the heavy fraction constituents of the introduced petroleum feedstock than the light fraction constituents, which supports upgrading and desulfurization of the heavy fraction by longer exposure to introduced supercritical water. When present, the nature of the downflowing supercritical water reactor induces a longer residence time for the light fraction constituents than the heavy fraction constituents, supporting their upgrading and desulfurization.

The method of upgrading the petroleum feedstock does not require a method of introducing hydrogen such as would be required with a traditional hydrocracking or hydrotreating process. Water, and specifically water in the supercritical state, acts as a hydrogen donor inside the upflowing reactor and, when present, in the downflowing reactor. The method of upgrading the petroleum feedstock also does not require the separation of the heavy fraction from the light fraction of the petroleum feedstock before introduction. The method also does not require separation of the petroleum feedstock from water during upgrading and desulfurization.

The introduction of a separate auxiliary feedstock into the bottom of the upflowing reactor facilitates the dispersion of heavier petroleum feedstock constituents from the bottom of the upflowing reactor back into the bulk fluid present in the reactor. The dispersion and dilution of the heavier constituents prevent coking in the fluid within the reactor proximate to the bottom and facilitates moving any accumulated heavier petroleum feedstock constituents in a generally upwards direction.

By optionally including catalytic materials, hydrogen transfer agents, or chemicals operable to adsorb free-radicals with the introduced auxiliary feedstock, the free-radical reaction associated with coking can be mitigated and upgrading reactions facilitated by the direct introduction with the auxiliary feedstock into the portion of the petroleum feedstock constituents that typically contains polyaromatics and heavy heteroatom species versus the remainder of the fluid in the upflowing reactor.

BRIEF DESCRIPTION OF THE DRAWINGS

These and other features, aspects, and advantages of the present invention are better understood with regard to the following Detailed Description of the Preferred Embodiments, appended Claims, and accompanying Figures, where:

In the accompanying Figures, similar components or features, or both, may have the same or similar reference label. FIGS. 1-3 are general schematics of several embodiments of the supercritical water petroleum upgrading system and their methods of use. The Figures and their description facilitate a better understanding of the system and its method of use. In no way should the Figures limit or define the scope of the invention.

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur. "Operable" and its various forms means fit for its proper functioning and able to be used for its intended use. "Associated" and its various forms means something connected with something else because they occur together or that one produces the other.

Spatial terms describe the relative position of an object or a group of objects relative to another object or group of objects. The spatial relationships apply along vertical and horizontal axes. Orientation and relational words, including "up", "down", "higher", "lower" and other like terms, are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The invention encompasses and bounds smaller ranges of the interval subject to any specific exclusion provided.

Where the Specification and appended Claims reference a method comprising two or more defined steps, the defined steps can be carried out in any order or simultaneously except where the context excludes that possibility.

FIG. 1

Figure 1:
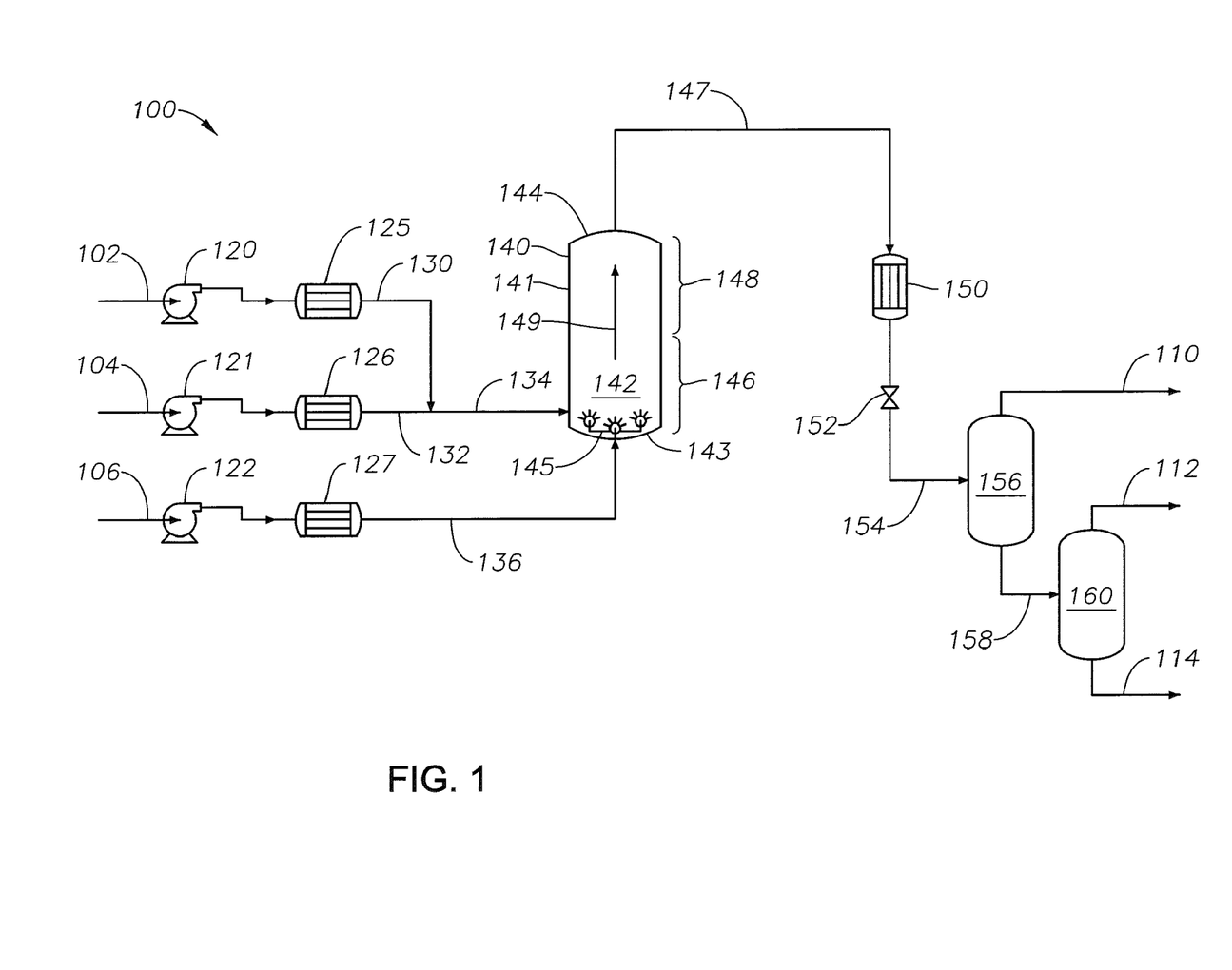
FIG. 1 is a general schematic of an embodiment of the supercritical water petroleum upgrading system.

Supercritical water petroleum upgrading system 100 utilizes both water and an auxiliary feedstock for upgrading a petroleum feedstock into an upgraded and desulfurized petroleum product. Upgrading system 100 introduces the water from a source outside of upgrading system 100 utilizing water supply line 102. Upgrading system 100 introduces petroleum feedstock from a source outside of upgrading system 100 utilizing petroleum feedstock supply line 104. Upgrading system 100 introduces the auxiliary feedstock from a source outside of upgrading system 100 utilizing auxiliary feedstock supply line 106. An embodiment of the method of upgrading a petroleum feedstock includes introducing the water and the petroleum feedstock to the upgrading system such that the volumetric flow ratio of the water to the petroleum feedstock is in a range of from about 10:1 to about 1:10 at standard conditions (60° F., 1 atm). An embodiment of the method of upgrading a petroleum feedstock includes introducing the water and the petroleum feedstock to the upgrading system such that the volumetric flow ratio of the water to the petroleum feedstock is in a range of from about 10:1 to about 1:2 at standard conditions.

Supercritical water petroleum upgrading system 100 produces several products and by-products of the process. Upgrading system 100 passes a gas-phase hydrocarbon product using gas-phase product line 110. Upgrading system 100 passes the upgraded and desulfurized petroleum product using hydrocarbon product line 112. Upgrading system 100 passes an aqueous-phase water product using water product line 114.

Supercritical water petroleum upgrading system 100 pressurizes and pre-heats the introduced water and petroleum feedstock using pumps 120 and 121, respectively, and pre-heaters 125 and 126, respectively. The pre-heated water passes into pre-heated water stream 130. An embodiment of the method includes operating the upgrading system such that the pre-heated water is maintained at a temperature in a range of from about 300° C. to about 800° C. An embodiment of the method includes operating the upgrading system such that the pre-heated water is maintained at a temperature in a range of from about 400° C. to about 650° C. An embodiment of the method includes operating the upgrading system such that the pre-heated water is maintained at a pressure equal to or greater than the critical pressure of water. The pre-heated petroleum feedstock in pre-heated petroleum feedstock stream 132 has a temperature in a range of from about 30° C. to about 300° C. An embodiment of the method of upgrading a petroleum feedstock includes operating the upgrading system such that the pre-heated petroleum feedstock has a temperature in a range of from about 50° C. to about 150° C. An embodiment of the method includes operating the upgrading system such that the pre-heated petroleum feedstock has a temperature no greater than 150° C. An embodiment of the method includes operating the upgrading system such that the pre-heated petroleum feedstock has a pressure equal to or greater than about the critical pressure of water. Not allowing the pre-heated petroleum feedstock to exceed 150° C. prevents the petroleum feedstock from thermally cracking and forming coke precursors and coke within the feed lines, which can create a petroleum sludge that fouls upgrading system 100.

Supercritical water petroleum upgrading system 100 combines the contents of pre-heated petroleum feedstock stream 132 and pre-heated water stream 130 into mixed stream 134. An embodiment of the method of upgrading a petroleum feedstock includes introducing the water and petroleum feedstock to the upgrading system such that the molar flow ratio of pre-heated water to the pre-heated petroleum feedstock in the mixed stream is maintained in a range of from about 7:1 to about 145:1. Upgrading system 100 can include a dedicated mixing device, for example a static mixture, an inline mixer or an impeller-embedded mixer, to mix the contents of the pre-heated streams together and pass the resultant into mixed stream 134.

As shown in FIG. 1, supercritical water petroleum upgrading system 100 also pressurizes and pre-heats the separately introduced auxiliary feedstock using pump 122 and pre-heater 127. An embodiment of the method of upgrading a petroleum feedstock includes introducing auxiliary feedstock to the upgrading system such that the volumetric flow ratio of the pre-heated auxiliary feedstock to the mixed stream as determined at ambient temperature and at the respective pressure conditions of the pre-heated auxiliary feedstock and the mixed streams is maintained in a range of from about 2:1 to about 1:1000 at standard conditions. Upgrading system 100 passes the pre-heated auxiliary feedstock through pre-heated auxiliary feedstock line 136. An embodiment of the method includes operating the upgrading system such that the temperature difference between the pre-heated auxiliary feedstock and the mixed petroleum feedstock is maintained in a range of from about −50° C. to about 250° C. An embodiment of the method includes operating the upgrading system such that the temperature differential between the pre-heated auxiliary feedstock and the mixed petroleum feedstock is maintained in a range of from about −20° C. to about 100° C.

Supercritical water petroleum upgrading system 100 includes upflowing supercritical water reactor 140. Upflowing reactor 140 has enclosed shell 141, which defines interior 142, bottom 143, top 144, lower portion 146 and upper portion 148. Upgrading system 100 passes the contents of mixed stream 134—the pre-heated petroleum feedstock and water combination—through lower portion 146 and into interior 142 of upflowing reactor 140 proximate to bottom 143. Internal fluid distributor 145 in interior 142 fluidly couples to pre-heated auxiliary feedstock line 136 in lower portion 146. Upgrading system 100 passes the contents of pre-heated auxiliary feedstock line 136 into interior of 142 of upflowing reactor 140 through internal fluid distributor 145. Upflowing reactor 140 has top 144 to which reactor product stream 147 couples. Reactor product stream 147 acts as an egress for the modified hydrocarbon products and leftover water from the upgrading operation within upflowing reactor 140.

Supercritical water petroleum upgrading system 100 operates upflowing supercritical water reactor 140 such that the contents of mixed stream 134, the contents of pre-heated auxiliary feedstock line 136, and the contents of the fluid in interior 142 of upflowing reactor 140 interact at reactor operating conditions such that an upgraded and desulfurized petroleum product forms. The fluid in interior 142 of upflowing reactor 140 comprises a mixture of hydrocarbons in various states of reaction, water in the supercritical state, optionally catalyst, optionally paraffinic sulfur compounds, heteroatom containing hydrocarbons, and heteroatom species like sulfur.

Upflowing reactor 140 is operable to crack the large hydrocarbon molecules typically present in the heavy fraction as well as to remove the heteroatom impurities without using externally-supplied hydrogen and without generating coke or coke precursors. The upflowing reactor operating conditions include operating at temperatures and pressures equal to or greater than the critical temperature and pressure of water. An embodiment of the method of upgrading a petroleum feedstock includes operating the upflowing supercritical water reactor such that the operating temperature is maintained in a range of from about 380° C. to about 600° C. An embodiment of the method includes operating the upflowing supercritical water reactor such that the operating temperature is maintained in a range of from about 390° C. to about 500° C.

Upflowing reactor 140 is operable to direct the fluid in interior 142 in a generally upwards direction. As shown in FIG. 1, supercritical water petroleum upgrading system 100 introduces the contents of mixed stream 134 and pre-heated auxiliary feedstock line 136 into interior 142 of upflowing reactor 140 in lower portion 146 such that both streams separately mix with the fluid already present in lower portion 146 of upflowing reactor 140. The coordinated introduction and passing of fluids from upflowing reactor 140 motivates the fluid in interior 142 to flow generally in an upward direction from bottom 143 towards top 144 along upward directed reactor fluid flow arrow 149.

Due to a variety of issues, including overall residence time within upflowing reactor 140, solvency or lack thereof with supercritical water, differing molecular weights, and specific gravity of the fluids, the heavy hydrocarbons and heteroatom species introduced with the heavy fraction of the petroleum feedstock and in the fluid already present in interior 142 tend to separate from the remainder of the fluid in upflowing reactor 140 as the fluid moves upward from lower portion 146 to upper portion 148. The heavy hydrocarbon constituents remaining unreacted in upflowing reactor 140 eventually circulate downward under the influence of gravity and descend toward bottom 143 from upper portion 148.

Upflowing reactor 140 is also operable to introduce pre-heated auxiliary feedstock passing from pre-heated auxiliary feedstock line 136 coupled to lower portion 146 such that upward fluid momentum is imparted and mixing occurs with the fluid in interior 142 proximate to bottom 143. The distribution of auxiliary feedstock into the fluid of reactor 140 through internal fluid distributor 145 operates to disrupt the aggregation of, to dilute and to provide upward fluid momentum to heavy hydrocarbons and heteroatom constituents that may have separated from the fluid in reactor 140 and migrated downward towards bottom 143. The configuration of reactor 140 renders it operable to introduce pre-heated auxiliary feedstock through internal fluid distributor 145. Internal fluid distributor 145 is located in lower portion 146 proximate to bottom 143 and distributes auxiliary feedstock into the fluid located there. Dilution and fluid momentum prevents the retention of heat, the separation of water from the heavy hydrocarbons constituents, and dampens pre-coking and coking reactions near bottom 143 and generally in lower portion 146.

Supercritical water petroleum upgrading system 100 passes a mixture of water, hydrocarbons of varying molecular weight and reaction states, disassociated impurities and other materials from interior 142 of upper portion 148 of upflowing reactor 140 through reactor product stream 147. An embodiment of the method of upgrading a petroleum feedstock includes operating the upgrading system such that the temperature differential between the contents of the mixed petroleum feedstock and the upflowing reactor product fluid is maintained in a range of from about 50° C. to about 300° C. An embodiment of the method includes operating the upgrading system such that the upflowing reactor product fluid is maintained at a pressure in a range of from about 3,200 psig to about 6,000 psig. An embodiment of the method includes operating the upgrading system such that the reactor product stream material is maintained at a pressure in a range of from about 3,300 psig to about 4,500 psig.

Supercritical water petroleum upgrading system 100 depressurizes and cools the contents of reactor product stream 147 using condenser 150 and letdown valve 152, passing the cooled and depressurized material through discharged stream 154. An embodiment of the method of upgrading a petroleum feedstock includes operating the upgrading system such that the discharged stream material is maintained at a pressure in a range of from about −10 psig to about 30 psig. An embodiment of the method includes operating the upgrading system such that the discharged stream material is maintained at a pressure in a range of from about −10 psig to about 10 psig. An embodiment of the method includes operating the upgrading system such that the discharged stream material is maintained at a temperature in a range of from about 10° C. to about 200° C. An embodiment of the method includes operating the upgrading system such that the discharged stream material is maintained at a temperature in a range of from about 30° C. to about 150° C.

Discharged stream 154 couples gas-liquid separator 156 to supercritical water reactor 140. Supercritical water petroleum upgrading system 100 passes the contents of discharge stream 154 to gas-liquid separator 156. Gas-liquid separator is operable to separate lower-carbon count hydrocarbons, hydrogen, sour gases, other gaseous products like carbon monoxide and carbon dioxide, and some water vapor as a gas-phase hydrocarbon product from introduced discharge stream 154 contents and produce the gas-phase hydrocarbon product using gas-phase product line 110. Upgrading system 100 passes the remnant liquid through liquid phase stream 158.

Liquid phase stream 158 couples oil-water separator 160 to gas-liquid separator 156. Supercritical water petroleum upgrading system 100 passes the contents of liquid phase stream 158 to oil-water separator 160. Oil-water separator 160 is operable to separate the hydrocarbon-phase upgraded and desulfurized petroleum product from the introduced liquid phase stream 158 and produce the product using hydrocarbon product line 112. Upgrading system 100 passes the aqueous-phase water product using water product line 114.

FIG. 2

Supercritical water petroleum upgrading system 200 utilizes both water and the auxiliary feedstock for upgrading the petroleum feedstock into the upgraded and desulfurized petroleum product similar to supercritical water petroleum upgrading system 100. Several differences between the operation of upgrading system 100 and upgrading system 200, however, are readily apparent between FIGS. 1 and 2.

Figure 2:
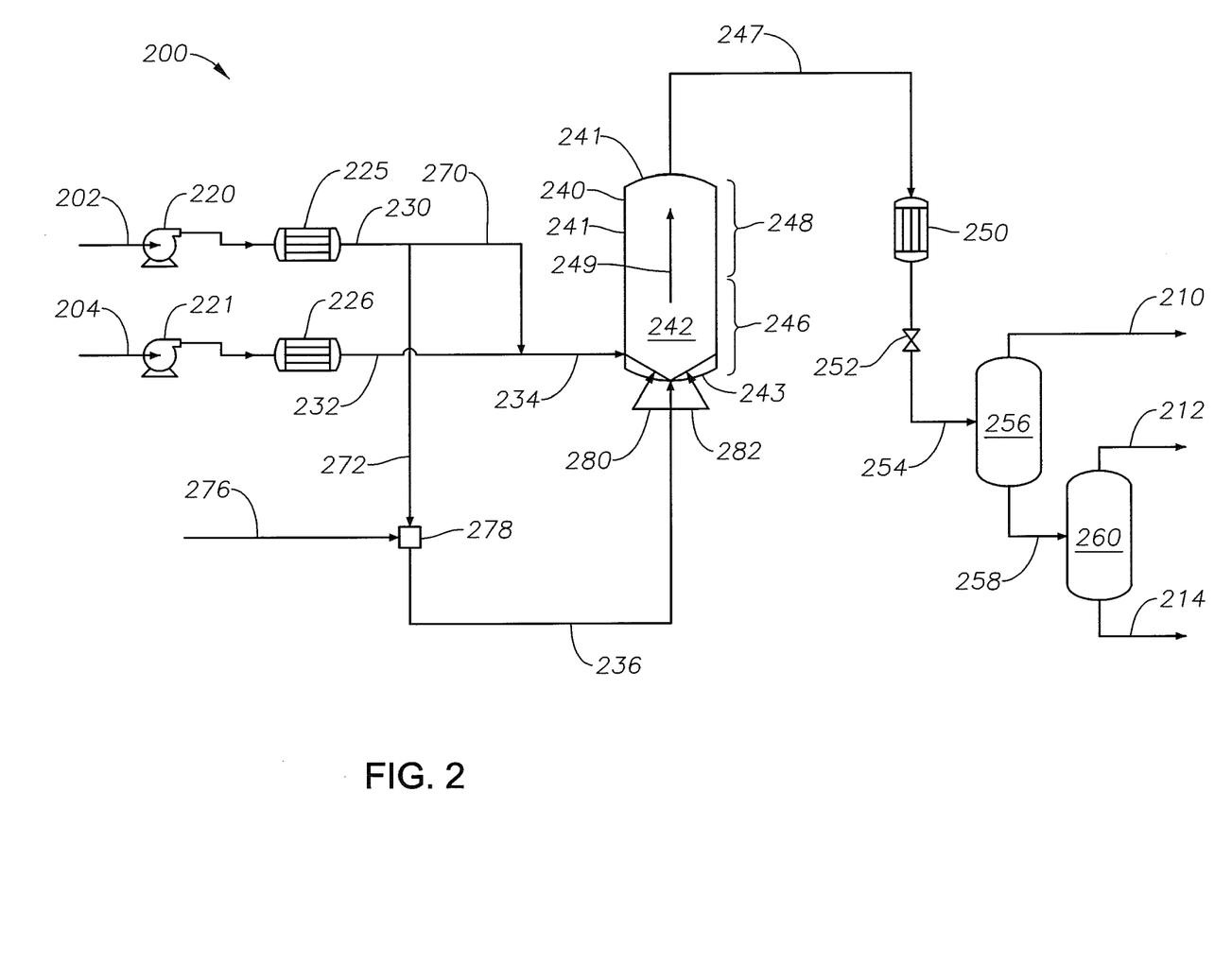
FIG. 2 is a general schematic of an embodiment of the supercritical water petroleum upgrading system.

In FIG. 1, the axillary feedstock is pre-heated and passed into interior of upflowing reactor 140 via pre-heated auxiliary feedstock line 136. The auxiliary feedstock originates from a dedicated source outside supercritical water petroleum upgrading system 100. In FIG. 2, supercritical water petroleum upgrading system 200 forms pre-heated auxiliary feedstock for use in upflowing reactor 240 by apportioning the pre-heated water from pre-heated water stream 230 into first pre-heated water portion stream 270 and second pre-heated water portion stream 272. Upgrading system 200 combines the contents of pre-heated petroleum feedstock stream 232 and first pre-heated water portion stream 270 to form the combination that mixed stream 234 conveys into lower portion 246 of upflowing reactor 240. Upgrading system 200 also combines the contents of second pre-heated water portion stream 272 and optional auxiliary feed stream 276, which can contain water, lower-carbon hydrocarbons, aromatics heterogeneous or homogeneous catalysts, and other process additives, and combinations thereof, to form the pre-heated auxiliary feedstock that pre-heated auxiliary feedstock line 236 conveys into lower portion 246 of upflowing reactor 240. At the physical intersection of second pre-heated water portion stream 272 and optional auxiliary feed stream 276, mixer 278 assisting the incorporation of the contents of the two streams together into the pre-heated auxiliary feedstock.

Also in FIG. 1, supercritical water reactor 140 includes internal fluid distributor 145 to mix, provide upward momentum to, and disperse the fluid in interior 142 of upflowing reactor 140 into lower portion 146. In FIG. 2, pre-heated auxiliary feedstock line 236 is apportioned into several streams and couples with upflowing reactor 240 at several auxiliary injection ports 280. Upflowing reactor 240 has internal V-shaped false bottom 282 in lower portion 246 into which heavy hydrocarbons constituents migrate.

The manner of coupling of auxiliary feedstock line 236 auxiliary injection ports 280 with upflowing reactor 240 as shown in FIG. 2 shows that the pre-heated auxiliary feedstock is not introduced into interior 242 parallel with upward directed reactor fluid flow arrow 249. Rather, the auxiliary feedstock is introduced through multiple auxiliary injection ports 280 passing through V-shaped false bottom 282 such that the auxiliary feedstock works to physically mix into, provide physical fluid momentum to and chemically dilute any separated and concentrated heavy hydrocarbons constituents in the fluid proximate to bottom 243 of upflowing reactor 240.

FIG. 3

Figure 3:
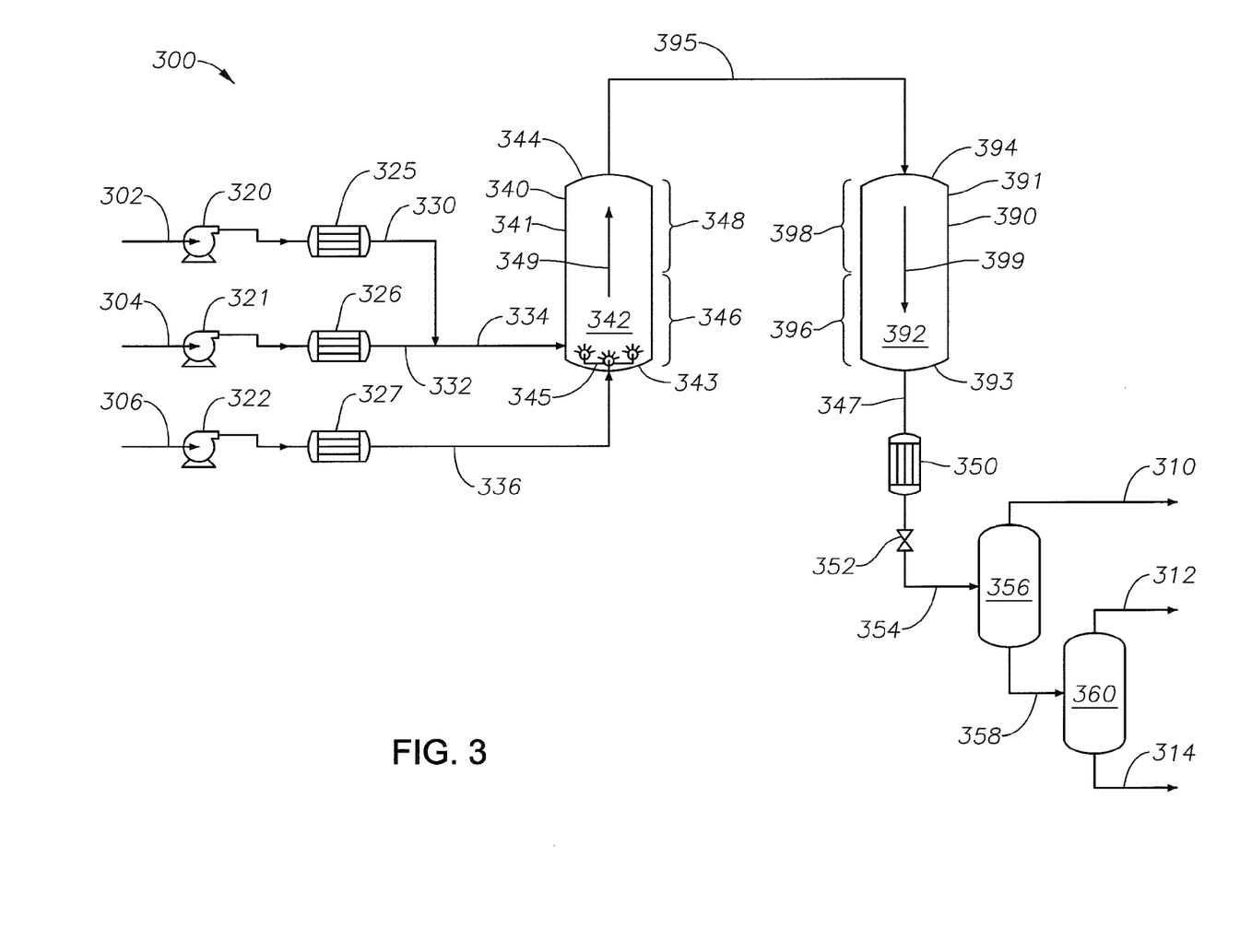
FIG. 3 is a general schematic of an embodiment of the supercritical water petroleum upgrading system.

Supercritical water petroleum upgrading system 300 utilizes both water and an auxiliary feedstock for upgrading the petroleum feedstock into the upgraded and desulfurized petroleum product similar to supercritical water petroleum upgrading system 100. Upgrading system 300 includes downflowing supercritical water reactor 390 downstream from upflowing supercritical water reactor 340.

Supercritical water petroleum upgrading system 300 includes upflowing supercritical water reactor 340 and downflowing supercritical water reactor 390. Upflowing supercritical water reactor 340 has lower portion 346 to which both mixed stream 334 and pre-heated auxiliary feedstock line 336 couple and top 344 to which intermediary line 395 couples. Downflowing reactor 390 has shell 391 which defines interior 392, bottom 393 to which reactor product stream 347 acts as an egress for the modified hydrocarbon products and leftover water from the upgrading processes, lower portion 396, and upper portion 398 to which intermediary line 395 also couples proximate to top 394, fluidly connecting upflowing reactor 340 and downflowing reactor 390 in series.

Supercritical water petroleum upgrading system 300 operates both upflow and downflow reactors 340 and 390 such that the introduced petroleum feedstock combined with the water and the contents of the introduced auxiliary stream at the respective reactor operating conditions forms the upgraded and desulfurized petroleum product. Upflowing and downflowing reactors 340 and 390 are operable to crack hydrocarbon molecules as well as remove impurities, including sulfur, nitrogen and metal-containing heteroatom species, in the petroleum feedstock without using externally-supplied hydrogen and without generating coke or coke precursors. Upflowing reactor 340 typically operates at the same or lower temperature than downflowing reactor 390 such that upflowing reactor 340 operates to upgrade the heavy hydrocarbon constituents and downflowing reactor 390 operates to upgrade the light hydrocarbon constituents. An embodiment of the method of upgrading a petroleum feedstock includes operating the upflowing and downflowing reactors such that the temperature in each reactor is about 420° C. An embodiment of the method includes operating the downflowing reactor such that the temperature of the fluid contained in the reactor is maintained at a temperature in a range of from about 0° C. to about 100° C. greater than the temperature at which the fluid contained in the upflowing reactor is maintained. An embodiment of the method includes operating the downflowing reactor such that the temperature of the fluid contained in the reactor is maintained at a temperature in a range of from about 0° C. to about 50° C. greater than the temperature at which the fluid contained in the upflowing reactor is maintained.

Upflowing reactor 340 is operable to direct the fluid contained in interior 342 in a generally upwards direction while downflowing reactor 390 is operable to direct the fluid contained in interior 392 in a generally downward direction. As shown in FIG. 3, supercritical water petroleum upgrading system 300 introduces the contents of mixed stream 334 and pre-heated auxiliary feedstock line 336 into lower section 346. The coordinated introduction and passing of fluids motivates the fluid within upflowing reactor 340 to flow generally in an upward direction along upward directed reactor fluid flow arrow 349 from bottom 343, towards top 344 and out upflowing reactor 340 through intermediary line 395. Upward fluid momentum is imparted in the fluid contained within upflowing reactor 340 using internal fluid distributor 345. The hydrocarbons constituencies are continually redistributed in the fluid within upflowing reactor 340, carried upwards and eventually out by fluid flow momentum. The heavy hydrocarbons constituencies tend to reside in upflowing reactor 340 for a longer period than the light hydrocarbons and heteroatom constituencies.

Supercritical water petroleum upgrading system 300 introduces the contents of intermediate stream 395 into upper portion 398 of downflowing reactor 390. The coordinated introduction and passing of fluids and gravity motivates the fluid in downflowing reactor 390 to flow generally in a downward direction along downward directed reactor fluid flow arrow 399. The fluid in downflowing reactor 390 flows from top 394 to bottom 393 and out through reactor product stream 347. The hydrocarbons constituents in downflowing reactor 390 are continually redistributed by fluid flow momentum and are carried generally downward. The hydrocarbons constituents eventually pass from downflowing reactor 390. The lighter hydrocarbons constituents tend to reside in downflowing reactor 390 for a longer period than the heavier hydrocarbons constituents. Downflowing reactor 390 passes a mixture of water, hydrocarbons of varying molecular weight and reactive state, disassociated impurities and other materials through reactor product stream 347.

Petroleum Feedstock and Lighter and Heavier Petroleum Feedstock Fractions

The method of upgrading a petroleum feedstock includes introducing the petroleum feedstock as part of a mixed stream into the upflowing supercritical water reactor. The "petroleum feedstock" can originate from a single source or can be a blend of hydrocarbon-bearing materials. Examples of a useful petroleum feedstock includes a crude oil, a distillate or fraction of crude oil originating from a refinery, a distillation residue, a "cracked" product from a hydrocracking or thermal cracking facility, a condensate and other hydrocarbon-bearing liquid from natural gas production, a finished petrochemical product, liquefied coal, bitumen and hydrocarbon product from a biomass conversion process.

The introduced petroleum feedstock has a heavy fraction and a light fraction. The heavy fraction of the introduced petroleum feedstock is defined as the portion where 5 volume percent (vol. %) of the fraction vaporizes at 540° C. as measured using ASTM D 1160. The heavy fraction possesses a greater quantity of asphaltenes, polyaromatic and heteroatom compounds, including sulfur, nitrogen and metal-bearing compounds, than the light fraction. Paraffinic and aromatic sulfur compounds such as alkylated dibenzothiophenes are examples of sulfur heteroatom compounds present in the heavy fraction. For example, a whole range Arabian Heavy crude oil has 34 weight percent (wt. %) heavy fraction and the balance the light fraction. The heavy fraction includes 14.5 wt. % asphaltenes, 8.53 wt. % sulfur (by sulfur weight) and 217 parts-per-million (ppm) wt. % metal (by metal weight). If measured for the entire whole range Arabian Heavy crude, the asphaltene, sulfur and metal content are 4.9 wt. %, 2.88 (sulfur) wt. % and 73 ppm (metal) wt. %, respectively.

Upflowing Supercritical Water Reactor

The supercritical water petroleum upgrading system includes the upflowing supercritical water reactor. The system is operable to introduce the mixed petroleum feedstock into the lower portion of the upflowing reactor. In the interior of the upflowing reactor, supercritical water breaks down the hydrocarbons constituents of the heavy fraction into low-carbon hydrocarbons and byproducts.

The mixed petroleum feedstock is introduced into the upflowing supercritical water reactor such that the fluid already present in the upflowing reactor maintains an upward fluid momentum. By maintaining a relatively steady overall upwards superficial fluid velocity, the introduced mixed petroleum feedstock, as part of the fluid rising inside the upflowing reactor, fractionates into light and heavy fraction constituents. The effects of gravity and fluid friction retard the upward progress of the heavy hydrocarbons and heteroatom constituents, for example, polyaromatics. The temperature of the fluid in the upflowing reactor also plays a part in the separation of the heavy and light fraction constituents as the larger molecules absorb greater amounts of latent energy. The constituents of the light fraction are readily miscible in supercritical water and tend to stay in the upwards flow of the fluid in the interior. The constituents of the heavy fraction are not as miscible with the supercritical water and tend to separate out of the fluid in the upflowing reactor.

The dichotomy of residence time—relatively short for the lighter constituents and longer for the heavier constituents—results in the heavier constituents having much greater exposure to the effects of supercritical water. The lighter constituents and reaction products of the upflowing reactor tend to carry through and egress the upflowing reactor in a relatively short timeframe. The reduced residence time for the lighter constituents prevents cracking (either thermally or catalytically) into less desirable atmospheric-pressure hydrocarbon gases. An embodiment of the method of upgrading a petroleum feedstock includes operating the upgrading system such that the gas-phase hydrocarbon product, which are hydrocarbon gases that at atmospheric pressure have a boiling point temperature of less than 35° C., comprises a range of about 1 wt. % to about 5 wt. % of the combined gas-phase hydrocarbon, the upgraded and desulfurized petroleum and the aqueous-phase products.

The heavier constituents, which tend to separate from the upwards fluid flow, recirculate in the upflowing reactor until converted into lighter reaction products by repeated exposure to supercritical water. The internal recycling supports hydrocarbon upgrading, desulfurization, denitroification and demetalization reactions. Supercritical water converts the heavy hydrocarbons into intermediate and low-carbon hydrocarbons similar to the hydrocarbons present in the light fraction. Supercritical water also converts the heteroatom species into low-carbon hydrocarbons as well as metal-containing compounds. These non-hydrocarbons also egress the upflowing reactor.

The upflowing supercritical water reactor includes at least two types of ports through which fluids are introduced. The upflowing reactor has a port for introducing the mixed petroleum feedstock. The upflowing reactor has another, separate port for introducing the auxiliary feedstock. Both types of ports are located proximate to the bottom of the upflowing reactor such that the introduced fluids cause the fluid in the upflowing reactor to move in a generally upwards direction. The upflowing reactor has a third type of port—an outlet port—that is located proximate to the top. The outlet port is operable to pass a reaction product fluid, which is a mixture of supercritical water and hydrocarbon reaction products, reaction by-products and some of the light petroleum feedstock that remains unreacted.

As previously described, the hydrocarbons and heteroatom species of the heavy fraction tend to flow along with the fluid in the interior of the upflowing reactor in a generally upward direction until fluid friction, gravity and separation from the fluid in the upflowing reactor causes the hydrocarbons species to stop and counter-flow, settling towards the bottom of the upflowing reactor. Without any additional fluid or chemical intervention, the heavy hydrocarbons and heteroatom constituents would accumulate in the lower portion of the upflowing reactor in pools and eddies. The heavy components would separate from the fluid in the upflowing (the higher-carbon hydrocarbons not having an affinity with supercritical water), become denser and more compact in the low-flow environment, retain more heat, and initiate condensation and free-radical reactions leading to coking in the bottom.

The upflowing supercritical water reactor is operable to introduce the auxiliary feedstock into the lower portion of the upflowing reactor such that the fluid in the reactor proximate to the bottom is not static or otherwise lacking in fluid momentum. An auxiliary feedstock introduction port can be directed such that the auxiliary fluid is introduced into the interior of the upflowing reactor at a non-parallel angle to the generally upflowing reactor fluid flow direction ranging from near-parallel to perpendicular. An embodiment of the supercritical water petroleum upgrading system includes an upflowing reactor with more than one auxiliary feedstock introduction port.

An embodiment of the supercritical water petroleum upgrading system includes an upflowing reactor with an internal distribution device that is operable to distribute the auxiliary feedstock into the fluid contained within the upflowing reactor. Examples of known internal distribution devices operable to distribute one fluid into another fluid include a fluid sparger, nozzles, sprayers and a distribution plate.

Regardless of the manner of introduction, the upflowing reactor operates to distribute the auxiliary feedstock into the bottom of the upflowing reactor such that the fluid inside the upflowing reactor maintains a sufficient overall superficial fluid velocity to prevent the formation of stagnant fluid zones at the bottom of the upflowing reactor. The result is that there is minimal to no accumulation of solids or liquids in the bottom of the upflowing reactor, which aids in preventing the formation of coke in the upflowing reactor and downstream lines and units.

The minimum superficial fluid velocity is the minimum fluid flow rate for a given upflowing reactor configuration. The minimum superficial fluid velocity is the minimum fluid flow rate which is required to have a mass balance of greater than 98% as determined by the mass of the passing upflowing reactor product fluid versus the combined amount of the introduced mixed petroleum feedstock and the auxiliary feedstock for an extended period. The "extended period" is the period it takes to turn the fluid over in the upflowing reactor 100 times. "Fluid turnover" is calculated as the volume of the upflowing reactor divided by the weighted average volumetric flowrates per period for the total amount of the feedstocks, which includes the auxiliary feedstock and the mixed petroleum feedstock. Below the minimum superficial fluid velocity, the hydrocarbons and heteroatom constituents of the heavy fraction can accumulate in the upflowing reactor. This causes the determined mass balance of the upflowing reactor to go below 98%, which indicates mass accumulation within the upflowing reactor, for the extended period. The fluid in the upflowing reactor under this condition begins to include greater amounts of heavier hydrocarbon species.

The residence time within the upflowing rector is in a range of from about 0.5 minutes to about 60 minutes. An embodiment of the method includes where the residence time within the upflowing reactor is in a range of from about 5 minutes to about 15 minutes. A overall superficial fluid velocity that results in a residence time longer than about 60 minutes is too slow and likely would not be effective in suspending heavier hydrocarbons and heteroatom constituents with fluid momentum.

The separate introduction of the auxiliary feedstock and the petroleum feedstock imparts fluid momentum to the fluid in the lower portion of the upflowing supercritical water reactor while also specifically treating the fluid in the lower portion. The introduction of the auxiliary feedstock is directed towards preventing coking by disrupting, diluting and dispersing any aggregated heavy hydrocarbons constituents proximate to the bottom of the upflowing reactor. Coking is known to come from inter-radical condensation (that is, oligiomerization and polymerization) between higher-carbon hydrocarbon species such as polyaromatics and asphaltenes. The physically disruptive and chemical dilution advantages do not exist by combining the auxiliary feedstock with the mixed petroleum feedstock as the volume of the auxiliary feedstock stream is typically low compared to the mixed petroleum feedstock.

An embodiment of the supercritical water petroleum upgrading system includes the upflowing reactor that is operable to introduce auxiliary fluid such that the fluid in the lower portion of the upflowing reactor is maintained in a turbulent fluid flow regime. Introducing the auxiliary fluid in such a manner (maintaining a fluid flow regime having a Reynolds number greater than about 5000) not only supports mixing within the interior of the upflowing reactor but also prevents the retention of heat in the lower portion or bottom of the upflowing reactor as the fluid from the bottom turns over and blends with the bulk fluid in the interior and against the shell of the upflowing reactor. This prevents heat from building up in a dense, static fluid body. An embodiment of the supercritical water petroleum upgrading system includes an upflowing reactor that is operable to introduce the auxiliary fluid into the fluid within the interior of the upflowing reactor such that the auxiliary fluid has a greater upward fluid velocity than the average superficial velocity of fluid in the reactor. Introducing the auxiliary fluid such that it imparts upward fluid momentum into the fluid located proximate to the bottom of the upflowing reactor can not only impart upward fluid momentum to the higher-carbon hydrocarbons and heteroatom constituents the fluid located near the bottom of the upflowing reactor but also generally to the fluid in the interior, thereby improving overall reactor circulation, heat transfer and upgrading conversion.

The disruptive and dilutive effects of the auxiliary fluid on the fluid in the lower portion of the upflowing reactor can be monitored several ways. One method is detecting a temperature change at the bottom of the upflowing reactor as the incorporation of the auxiliary fluid alters the overall fluid composition (and therefore the heat capacity) of the fluid proximate to the bottom. Other means include direct fluid sampling for detecting auxiliary fluid components in the lower portion, viewing cells to directly observe the interior contents of the lower portion, and light or laser scattering for measuring turbidity.

Auxiliary Feedstock Composition

The addition of the auxiliary feedstock into the upflowing supercritical water reactor as a separate feed stream serves several purposes, some of which have been previously described regarding the configuration and operation of the upflowing reactor. The auxiliary feedstock also has a distributive and dilution function on the fluid proximate to the bottom in the upflowing reactor. The auxiliary feedstock is operable to introduce materials into the fluid near the bottom of the upflowing reactor that are beneficial for the upgrading and conversion of higher-carbon hydrocarbons constituents. The auxiliary feedstock may include compounds that quench free radical transfer by absorbing the free radical and preventing polymerization and condensation reactions. The auxiliary feedstock may contain catalyst or catalyst precursors and distribute those into the fluid near the bottom of the upflowing reactor to support catalytic cracking of the heavier hydrocarbons present, especially higher-carbon hydrocarbons. The auxiliary feedstock may introduce hydrogen transfer agents to support the saturation of unsaturated carbon bonds and promote upgrading of hydrocarbons in the upflowing reactor. The auxiliary feedstock can also introduce materials that increase the miscibility of the hydrocarbons in and decrease the overall density of the fluid near the bottom of the upflowing reactor, permitting the fluid near to bottom to become more buoyant and blend with the rest of the fluid in the upflowing reactor.

In combining dissimilar materials to form the auxiliary feedstock, for example, hydrocarbons and water, the feedstock components may be combined using a mixer known in the art, including a homogenizer or an ultrasonic mixer. The auxiliary feedstock in some instances may also include a minor amount of a surfactant to facilitate the reduction in surface tension between dissimilar materials and permit greater dispersion within one another. The components of the auxiliary feedstock may also be introduced into the supercritical water petroleum upgrading system separately and blended together through the turbulent mixing action found in system pumps, heat exchangers and mixing tees. If two or more components combine to form the auxiliary feedstock, the combination occurs before introduction into the upflowing reactor.

Supercritical Water

An embodiment of the method of upgrading a petroleum feedstock includes introducing the auxiliary feedstock comprising supercritical water into the upflowing supercritical water reactor. Water has critical point at 374° C. and 22.1 MegaPascals (MPa). At temperature and pressures conditions greater than 374° C. and 22.1 MPa, the phase boundary between liquid water and gaseous water disappears. Supercritical water has greater solubility with organic compounds and infinite miscibility with gases versus non-supercritical water; therefore, it has a dilution effect on the fluid proximate to the bottom of the upflowing reactor. The density of the supercritical water ranges from about 0.11 grams/milliliter (g/mL) to about 0.45 g/mL at about 25 MPa pressure and in a temperature range of from about 380° C. to about 450° C. Supercritical water also has the property of being able to stabilize hydrocarbons bearing free-radicals by surrounding the radicalized portion of the molecule, which inhibits inter-radical condensation reactions. Supercritical water can also release hydrogen in steam reforming and water-gas shift type reactions, resulting in free hydrogen that can support upgrading the hydrocarbons and heteroatom species in the reaction fluid.

Aromatic Hydrocarbons

An embodiment of the method of upgrading a petroleum feedstock includes introducing auxiliary feedstock comprising aromatic hydrocarbons into the upflowing supercritical water reactor. In such an embodiment, the aromatic hydrocarbons are present in a range of from about 1 weight percent (wt. %) to about 75 wt. % of the auxiliary feedstock. In such an embodiment, the aromatic hydrocarbons are present in a range of from about 5 wt. % to about 50 wt. % of the auxiliary feedstock. Aromatic hydrocarbons comprise one or more $C_{6-12}$ aromatic and alkyl aromatic compounds, including benzene, toluene and the xylenes. An embodiment of the method includes introducing an aromatic hydrocarbon consisting essentially of toluene.

A useful source for a mixture of aromatic hydrocarbons is reformate from a naphtha reformer. Aromatic compounds present in a reformate from a naphtha reformer includes ethyl benzene, trimethyl benzenes, tetramethyl benzenes, naphthalene, alkylated naphthalenes, tetrahydronaphthalene or "tetralin", alkylated tetrahydronaphthalenes, and other compounds having an benzene as part of its chemical structure. Reformate from catalytic naphtha reforming has a boiling point range of about 30° C. to about 220° C. Typical reformate contains about 70 to about 80 volume percent (vol. %) aromatic compounds.

The presence of aromatic compounds enhances the miscibility of supercritical water introduced with the auxiliary feedstock and any supercritical water in the fluid within the upflowing reactor contacted by the auxiliary feedstock. The aromatic compounds also help to suppress any free-radical reactions in the reactor fluid that can lead to coking by intercepting free-radical and temporarily stabilizing it within its aromatic structure.

Light Hydrocarbons

An embodiment of the method of upgrading a petroleum feedstock includes introducing auxiliary feedstock comprising light hydrocarbons into the upflowing supercritical water reactor. "Light hydrocarbons" include one or more paraffinic, naphthenic, olefinic and aromatic compounds that are liquid at standard atmospheric pressure and temperature conditions (that is, 60° F. and 1 atm). The initial boiling point (IBP) and the final boiling point (FBP) temperatures of the light hydrocarbons are in a range of from about 30° C. to about 360° C. At least 30 percent of the volume of the light hydrocarbons comprises aromatic hydrocarbons. Examples of useful light hydrocarbons include naphtha and diesel cuts from crude distillation units. Such cuts may be supplemented with previously-refined aromatic hydrocarbons to increase their aromatic volume content to greater than 30 percent.

Light hydrocarbons have great solubility with the organic compounds and supercritical water in the upflowing reactor. Light hydrocarbons are an effective diluent to the fluid proximate to the bottom of the upflowing reactor. As well, the aromatic content of the light hydrocarbons is useful in suppressing free-radical condensation reactions as previously described.

Catalytic Material and Catalyst Precursor

An embodiment of the method of upgrading a petroleum feedstock includes introducing the auxiliary feedstock further comprising a catalytic material into the upflowing supercritical water reactor. In such an embodiment, the catalytic material is present in a range of from about 100 ppm wt. % to about 1 wt. % of the auxiliary feedstock. The catalytic material consists of one to five active metals selected from the group consisting of iron, nickel, vanadium, molybdenum, chromium, manganese, cobalt, copper, zinc, tungsten, zirconium and titanium.

An embodiment of the method includes where the catalytic material is a hydrocarbon-soluble homogeneous catalyst. An embodiment of the method includes where the catalyst is a water-soluble homogeneous catalyst. The homogeneous catalyst upon introduction into the upflowing supercritical water reactor at operating conditions forms small particles that are operable to be taken up by the circulating fluid within the reactor.

An embodiment of the method includes where the catalytic material is a solid heterogeneous catalyst. The heterogeneous catalyst has an average particle diameter as measured by laser diffraction in a range of from about 0.1 micrometer ($\mu m$) to about 10 $\mu m$. The heterogeneous catalyst consists of one to five elements selected from the group consisting of iron, nickel, vanadium, molybdenum, chromium, manganese, cobalt, copper, zinc, tungsten, zirconium and titanium.

An embodiment of the method of upgrading a petroleum feedstock includes introducing the auxiliary feedstock comprising a catalyst precursor into the upflowing supercritical water reactor. In such an embodiment, the catalyst precursor is present in a range of from about 100 ppm wt. % to about 1 wt. % of the auxiliary feedstock. The catalyst precursor consists of one to five active metals selected from the group consisting of iron, nickel, vanadium, molybdenum, chromium, manganese, cobalt, copper, zinc, tungsten, zirconium and titanium. The active metal in the catalyst precursor converts into the metal oxide through hydrothermal reaction with supercritical water present in the reactor to form a catalytic material.

The catalytic material facilitates catalytic cracking of the hydrocarbons and heteroatom species associated with the heavy fraction of the petroleum feedstock. The auxiliary feedstock distributes the catalytic material or the catalyst precursor that converts into the catalytic material, or both, into the reactor fluid proximate to the bottom of the upflowing supercritical water reactor. The catalytic material therefore has a longer contact time with hydrocarbons and heteroatom species that may tend to aggregate proximate to the bottom of the reactor, facilitating their catalytic cracking.

Paraffinic Sulfur

An embodiment of the method of upgrading a petroleum feedstock includes introducing auxiliary feedstock comprising a paraffinic sulfur into the upflowing supercritical water reactor. In such an embodiment, the paraffinic sulfur is present in a range of from about 0.05 wt. % to about 1 wt. % of the auxiliary feedstock as calculated on a sulfur-only weight basis. Paraffinic sulfur includes paraffinic thiol compounds. An embodiment of the method includes introducing an auxiliary feedstock including one or more thiol compounds having a carbon number in a range of from $C_{1-8}$.

The paraffinic sulfur compounds, especially thiol compounds, decompose into low-carbon hydrocarbons and hydrogen sulfide at the operating conditions of the upflowing supercritical water reactor. Although not intending to be bound by theory, it is believed that at the reactor operating conditions the hydrogen sulfide acts as a hydrogen transfer agent by selectively removing hydrogen from water at supercritical conditions and transferring the hydrogen to the higher-carbon hydrocarbons and heteroatoms constituents proximate to the bottom of the upflowing reactor. This facilitates the cleaving of high-carbon molecules into smaller ones and the releasing of metal and non-metal contaminants from binding hydrocarbon structures.

Introduction Temperature

The auxiliary feedstock introduction temperature can have a useful impact upon the fluid located proximate to the bottom of the upflowing reactor. An embodiment of the method of upgrading a petroleum feedstock includes introducing auxiliary feedstock into the upflowing reactor at a lower temperature than the operating temperature of the upflowing reactor. Introducing auxiliary feedstock into the upflowing reactor at a lower temperature than the operating temperature of the reactor can retard any thermally-driven, non-catalytic reactions, including coking, in the fluid proximate to the bottom of the upflowing reactor by absorbing heat from the fluid. Depending on the composition of the auxiliary feedstock, the cooler auxiliary feedstock may also be denser than the fluid in the upflowing reactor into which it is introduced. The denser fluid can transfer fluid momentum from the introduced auxiliary fluid into the fluid at the bottom of the upflowing reactor. In an embodiment of the method where the auxiliary feedstock includes a catalyst precursor, the lower temperature of the auxiliary feedstock can also prevent premature thermal decomposition of the catalyst precursor into the catalytic material. As the auxiliary feedstock increases in temperature after introduction, the auxiliary feedstock constituents may become less dense and more buoyant than the fluid in the upflowing reactor. The more buoyant fluid moving in a generally upwards direction may lift the fluid in the upflowing reactor upwards through a "bubbling" effect.

An embodiment of the method of upgrading a petroleum feedstock includes introducing auxiliary feedstock into the upflowing reactor at a greater temperature than the operating temperature of the upflowing reactor. Introducing the auxiliary feedstock having aromatic hydrocarbons at a higher temperature may encourage the quenching of the coking free-radical reactions in the fluid at the bottom of the upflowing reactor. The ability of aromatic hydrocarbons to intercept free-radical propagation improves with greater temperature. As well, a higher temperature can also make the auxiliary feedstock more buoyant than the reactor fluid, which in turn can facilitate mixing of the auxiliary feedstock into the reactor fluid though a "lifting" or "bubbling" effect. This can benefit the transfer into the fluid of the upflowing reactor of catalyst materials and paraffinic sulfur.

Downflowing Supercritical Water Reactor

An embodiment of the supercritical water petroleum upgrading system includes a downflowing supercritical water reactor coupled in series with and downstream of the upflowing reactor. In embodiments of the system including the downflowing reactor, the system is operable to transfer fluid from the outlet of the upflowing reactor to the inlet of the downflowing reactor. Inside the downflowing reactor, supercritical water and any other active components introduced with the auxiliary feedstock in the upflowing reactor act to upgrade the intermediate and low-carbon hydrocarbons and heteroatom constituents not previously treated in the upflowing reactor.

High-carbon hydrocarbons constituents passing from the upflowing reactor quickly pass through the downflowing reactor and out the bottom. Since high-carbon hydrocarbons are not readily miscible with supercritical water, they tend to separate, channel and flow expediently downward in the downflowing reactor to the flow outlet proximate to the bottom. The intermediate and low-carbon hydrocarbons and heteroatom constituents introduced into and formed in the upflowing reactor tend to recirculate in the downflowing reactor due to buoyancy. Similar to the heavy constituents in the upflowing reactor, the lighter constituents are subjected to a period of desulfurization and upgrading with supercritical water and optionally any components introduced with the auxiliary feedstock. Any introduced catalyst and chain transfer agents carry forward and act upon the intermediate and low-carbon hydrocarbons constituents in the downflowing reactor.

An embodiment of the method of upgrading a petroleum feedstock includes operating the downflowing reactor at a temperature greater than the upflowing reactor. The temperature of the downflowing reactor can be greater than the upflowing reactor to enhance the upgrading and desulfurization of the lighter constituents, which are less reactive than the heavier hydrocarbons constituents at the same temperature. The increased temperature does not foster coking reactions in the remaining high-carbon hydrocarbons and heteroatom constituents because the downward flow configuration of the downflowing reactor and the reduced miscibility in the fluid in the downflowing reactor causes the heavy constituents to egress from the downflowing reactor quickly. In addition, most of the remaining high-carbon hydrocarbons species at this point in the process have already been moderately upgraded, which makes them less likely to initiate free-radical pre-coking or coking reactions. An embodiment of the method includes operating the downflowing reactor at a temperature in a range of 0° C. to 100° C. greater than the temperature of the upflowing reactor. An embodiment of the method includes operating the downflowing reactor at a temperature in a range of 0° C. to 50° C. greater than the temperature of the upflowing reactor.

Coke and Coke-Precursor Content of the Upgraded and Desulfurized Petroleum Product The described method and system is operable to minimize coke and coke-precursor formation and to reduce the amount of insoluble material introduced into the system by the petroleum feedstock. An embodiment of the method includes operating the upgrading system such that the upgraded and desulfurized petroleum product has less insoluble material than the introduced petroleum feedstock. An embodiment of the method includes operating the upgrading system such that the upgraded and desulfurized petroleum product has less than about 3 wt. % insoluble material. The determination of coke, coke-precursors and other insoluble material in either the introduced petroleum feedstock or the upgraded and desulfurized petroleum product, or both, can be performed using tests well known and understood to one of ordinary skill in the art using toluene or tetrahydrofuran (THF).

Operationally, the pressure differential between the stream containing the petroleum feedstock and the reactor product stream containing the upgraded and desulfurized petroleum product before passing through any pressure letdown device should not be greater than 5% of the operating pressure of the reactor(s). A pressure drop of greater than 5% between the inlet and outlet lines may indicate a buildup of insoluble material in the inlet feed or outlet product lines or inside the reactor itself causing fluid friction.

Supporting Equipment

An embodiment of the system includes many additional standard components or equipment that enables and makes operable the described apparatus, process, method and system. Examples of such standard equipment known to one of ordinary skill in the art includes heat exchanges, pumps, blowers, reboilers, steam generation, condensate handling, membranes, single and multi-stage compressors, separation and fractionation equipment, valves, switches, controllers and pressure-, temperature-, level- and flow-sensing devices.

Operation, control and performance of portions of or entire steps of a process or method can occur through human interaction, pre-programmed computer control and response systems, or a combination thereof.

EXAMPLES

Illustrative examples of specific embodiments facilitate a better understanding of the method of upgrading a petroleum feedstock using the supercritical water petroleum upgrading system. In no way should the Examples limit or define the scope of the invention.

The term "comparable" means similar or like. To compare a Comparative Example and an Example process on a similar operating basis, the difference in the flow rates and operating conditions between the Example and Comparative Example must be within 1%. Where a deviation is observed, although not intending to be bound by theory, an explanation is provided in an attempt to convey the current understanding for the deviation between the Example and the Comparative Example.

Example 1

For Example 1 and Comparative Example 1, a supercritical water petroleum upgrading system configuration similar to FIG. 1 is used. In reference to the properties of the streams for Example 1 and Comparison Example 1, the description and stream numbers for FIG. 1 are used. For Example 1, supercritical water reactor 140 receives the contents of both mixed stream 134 and pre-heated auxiliary feedstock line 136. For Comparative Example 1, however, supercritical water reactor 140 receives the content of mixed stream 134 but does not receive the contents of pre-heated auxiliary feedstock line 136. Except for not introducing the auxiliary feedstock as part of the process of Comparative Example 1, all other operational aspects of the processes between Example 1 and Comparative Example 1 are comparable.

For both Example 1 and Comparative Example 1, whole range Arabian heavy crude oil is introduced into the respective systems at a flow rate of about 20,000 barrels per day at standard conditions. The petroleum feedstock (stream 104) is pressurized to about 3,611 pounds per square inch gauge (psig) by a pump and then pre-heated to about 120° C. (stream 132). Deionized water (stream 102) is introduced into the respective systems at a flow rate of about 20,000 barrels per day at standard conditions, is pressurized to about 3,611 psig, and then preheated to greater than about 500° C. by a heater (stream 130). The deionized water has an electrical conductivity value of less than about 10.0 μmhos/cm. The mixed stream (stream 134), produced through a mixer, is introduced into the bottom of the upflowing reactor. The overall fluid residence time in the upflowing reactor is about 10 minutes. Effluent in the reactor product stream (stream 147) egresses from the top of the upflowing reactor and is cooled. After depressurization through a throttling valve acting as a let-down device (stream 154), a three-phase separation vessel produces a gas, a liquid oil and water products (streams 110, 112 and 114, respectively).

For Example 1, auxiliary feedstock (stream 106), which comprises about 90 wt. % water and about 10 wt. % toluene, which is pre-blended with an agitator to homogeneity, is introduced at a rate of 200 barrels per day at standard conditions. The auxiliary feedstock is pressurized, heated (stream 136) and introduced into the upflowing reactor. The weight of the introduced toluene in the auxiliary feedstock is about 0.0011 times that of the weight of the introduced petroleum feedstock.

The properties of the streams for Example 1 are provided in Table 1. The properties of the streams for Comparable Example 1 are comparable to those of Example 1 except for the lack of introduction of the auxiliary feedstock.

TABLE 1

Selected stream properties for Example 1 based upon FIG. 1 line numbers.
Example 1

| FIG. 1 Stream No. | 102 | 104 | 106 | 130 | 132 | 134 |
|---|---|---|---|---|---|---|
| Temperature (° C.) | 20 | 20 | 20 | 550 | 120 | 379 |
| Pressure (psig) | 10 | 10 | 10 | 3611 | 3611 | 3611 |
| Mass Flow (kg/hr) | 132223 | 117982 | 1303 | 132223 | 117982 | 250204 |

| FIG. 1 Stream No. | 136 | 147 | 154 | 110 | 112 | 114 |
|---|---|---|---|---|---|---|
| Temperature (° C.) | 500 | 430 | 59 | 25 | 25 | 25 |
| Pressure (psig) | 3611 | 3611 | 25 | 25 | 25 | 25 |
| Mass Flow (kg/hr) | 1303 | 251508 | 251508 | 7678 | 108838 | 134992 |

The properties of the introduced petroleum feedstock and the resultant liquid oil product for Example 1 are provided in Table 2. The properties of the introduced petroleum feedstock and the resultant liquid oil product for Comparative Example 1 are provided in Table 3.

TABLE 2

Selected properties of the introduced petroleum feedstock and the resultant liquid oil product for Example 1.
Example 1

| Property | Unit | Petroleum Feedstock | Liquid Oil Product | Note |
|---|---|---|---|---|
| Amount | Kg/hr | 117982 | 108838 | Yield = 92 wt. % |
| API Gravity | — | 27 | 38 | — |
| Total Sulfur | Wt. % sulfur | 3.00 | 0.94 | — |
| Asphaltenes | Wt. % | 4.88 | 0.62 | n-Heptane insoluble |
| Residue | Wt. % | 33.8 | 13.6 | Residue after distillation at 565° C. under atmospheric pressure |

TABLE 3

Selected properties of the introduced petroleum feedstock and the resultant liquid oil product for Comparative Example 1.
Comparative Example 1

| Property | Unit | Petroleum Feedstock | Liquid Oil Product | Note |
|---|---|---|---|---|
| Amount | Kg/hr | 117982 | 104404 | Yield = 88 wt. % |
| API Gravity | — | 27 | 35 | — |
| Total Sulfur | Wt. % sulfur | 3.00 | 1.90 | — |
| Asphaltenes | Wt. % | 4.88 | 1.18 | n-Heptane insoluble |
| Residue | Wt. % | 33.8 | 18.2 | Residue after distillation at 565° C. under atmospheric pressure. |

In comparing the results shown in Tables 2 and 3, the lower liquid oil product yield of Comparative Example 1 is the product of producing more light hydrocarbon gas. It appears that without the addition of the auxiliary feedstock into the bottom of the upflowing reactor to distribute the fluid inside the upflowing reactor that portions of the heavier hydrocarbons accumulated near the bottom of the upflowing reactor and over-cracked into atmospheric pressure hydrocarbon gases. The gas product for both Example 1 and Comparative Example 1 mainly comprises alkane hydrocarbons, including methane, ethane and propane. These atmospheric-pressure hydrocarbon gases have a relatively low market value on a carbon-carbon basis than the liquid hydrocarbon product, so producing less gas and more liquid hydrocarbon product is desirable.

Comparing the liquid oil product properties of Example 1 to Comparative Example 1, the liquid oil product of Example 1 appears to be a higher quality material. Although both materials were upgraded through supercritical water treatment, the upgraded material of Example 1 has a higher API gravity value, which indicates that it is easier for downstream systems to process versus the upgraded material of Comparative Example 1. The liquid oil product of Example 1 also contains less asphaltenes, sulfur and distillation residue than the liquid oil product of Comparative Example 1. The addition of the auxiliary feedstock into the lower portion of the upflowing reactor improved the quality and quantity of the liquid oil product.

Example 2

For Example 2 and Comparative Example 2, a supercritical water petroleum upgrading system configuration similar to FIG. 3 is used. The system uses two reactors coupled in series: an upflowing reactor and a downflowing reactor. An intermediary line couples the upflowing and downflowing reactors such that the intermediary product passing from the top of the upflowing reactor transfers into the top of the downflowing reactor. The reactor product stream at the bottom of the downflowing reactor passes the product of the series of reactors. The volume of each reactor is about 1 Liter (L). Both the upflowing and downflowing reactors are maintained at an operating temperature of about 420° C. and an operating pressure of about 3,600 psig using pressure-relief devices.

For both Example 2 and Comparative Example 2, the mixed stream introduced into the bottom of the first upflowing supercritical water reactor is made by continuously blending 0.6 L/hr of Arabian heavy crude oil and 1.0 L/hr of water, both volumes presented at standard conditions. The mixed stream is preheated before introduction. The intermediate stream from the top of the first upflowing reactor passes to the top of the second downflowing reactor and continues the upgrading process. The overall fluid residence time within each reactor averages about 10 minutes. Gas product amounts are measured by a wet test meter. After continuous operation for about 12 hours, a product sample is recovered for oil/water separation and liquid oil product comparison.

For Example 2, the auxiliary feedstock was introduced separately into the bottom of the upflowing reactor. The auxiliary feedstock is introduced into the upflowing reactor at a flowrate of about 0.13 L/hr. The auxiliary feedstock of Example 2 comprises about 95 wt. % water and about 5 wt. % toluene, which is homogenized by an ultrasonic mixer. Post-homogenization, the auxiliary feedstock is pressurized and preheated to a temperature of about 470° C., which converts the water into a supercritical fluid, just before introduction into the upflowing reactor. Comparative Example 2 does not receive auxiliary feedstock; otherwise, all other operational aspects of the processes between Example 2 and Comparative Example 2 are comparable.

For Example 2, the liquid oil product yield is about 96 wt. %. The Example 2 liquid product oil has an API gravity of about 36 and a sulfur content value of about 2.1 wt. % on a sulfur weight basis. For Comparative Example 2, the liquid oil product yield is about 91 wt. %. The lower liquid oil product yield reflects a corresponding increase in gas production for Comparison Example 2, which is not necessarily desirable when upgrading a petroleum feedstock. Comparative Example 2 also has a lower API gravity value (about 34 degrees) and a higher sulfur content value (about 2.4 wt. % on a sulfur weight basis) than Example 2. Example 2 and Comparative Example 2 demonstrate that the addition of the auxiliary feedstock into the lower portion of the upflowing reactor improves the quality of the liquid oil product and reduced the gas production over a comparable system not receiving the auxiliary feedstock introduction.

What is claimed is:

1. A method for upgrading a petroleum feedstock using a supercritical water petroleum upgrading system, the method comprising the steps of:
   introducing the petroleum feedstock into the supercritical water petroleum upgrading system;
   introducing a water into the supercritical water petroleum upgrading system;
   introducing an auxiliary feedstock into the supercritical water petroleum upgrading system,
     where the auxiliary feedstock comprises supercritical water,
     where the auxiliary feedstock further comprises aromatic hydrocarbons, where the aromatic hydrocarbons are present in a range of from about 1 weight percent (wt. %) to about 75 wt. % of the auxiliary feedstock,
     where the auxiliary feedstock also comprises paraffinic sulfur, where the paraffinic sulfur is present in a range of from 0.05 wt. % to about 1 wt. % of the auxiliary feedstock as calculated on a sulfur-only basis;
   operating the supercritical water petroleum upgrading system such that the petroleum feedstock and the water combine to form a mixed petroleum feedstock;
   operating the supercritical water petroleum upgrading system such that the mixed petroleum feedstock and the auxiliary feedstock are introduced separately and simultaneously into a lower portion of an upflowing supercritical water reactor, where the auxiliary feedstock is introduced into the upflowing reactor such that a portion of a fluid contained within the upflowing reactor located proximate to the bottom of the upflowing reactor does not lack fluid momentum;
   operating the upflowing supercritical water reactor such that the fluid contained within the upflowing reactor is maintained at a temperature equal to or greater than about the critical temperature of water, at a pressure equal to or greater than about the critical pressure of water, and is moving in a generally upwards direction, such that supercritical water forms from the introduced water in the fluid contained within the upflowing reactor;
   operating the upflowing supercritical water reactor such that the upgraded and desulfurized petroleum product forms as the reaction product between the introduced petroleum feedstock and the supercritical water in the fluid contained within the upflowing reactor;
   operating the supercritical water petroleum upgrading system such that an upflowing reactor product fluid passes from an upper portion of the upflowing reactor, where the product fluid comprises the upgraded and desulfurized petroleum product, and where the amount of passing upflowing reactor product fluid is equivalent to the combined amount of the introduced mixed petroleum feedstock and the auxiliary feedstock; and
   operating the supercritical water petroleum upgrading system such that a gas-phase hydrocarbon product, the upgraded and desulfurized petroleum product and an aqueous-phase product are separately selectively separated from the upflowing reactor product fluid.

2. The method of claim 1 where the petroleum feedstock and the water are introduced such that a volumetric flow ratio of introduced water to introduced petroleum feedstock is maintained in a range of from about 10:1 to about 1:10 at standard conditions.

3. The method of claim 1 further comprising the step of operating the supercritical water petroleum upgrading system such that the petroleum feedstock combined into the mixed petroleum feedstock has a temperature no greater than about 150° C. and a pressure equal to or greater than about the critical pressure of water.

4. The method of claim 1 further comprising the step of operating the supercritical water petroleum upgrading system such that a volumetric flow ratio of the auxiliary feedstock to the mixed petroleum feedstock at ambient temperature and at respective pressure conditions is in a range of from about 2:1 to about 1:1000 at standard conditions.

5. The method of claim 1 further comprising the step of operating the supercritical water petroleum upgrading system such that a temperature difference between the auxiliary feedstock and the mixed petroleum feedstock is maintained in a range of from about −50° C. to about 250° C.

6. The method of claim 1 further comprising the step of operating the upflowing supercritical water reactor such that the temperature of the fluid within in the upflowing reactor is maintained in a range of from about 380° C. to about 600° C.

7. The method of claim 1 further comprising the step of operating the supercritical water petroleum upgrading system such that the temperature difference between the upflowing reactor product fluid and the mixed petroleum feedstock is maintained in a range of from about 50° C. to about 300° C. and the pressure of the upflowing reactor product fluid is maintained in a range of from about 3,200 psig to about 6,000 psig.

8. The method of claim 1 where the auxiliary fluid is introduced into the upflowing supercritical water reactor such that the auxiliary fluid has a greater upward fluid velocity than the average superficial velocity of fluid in the reactor.

9. The method of claim 1 where the auxiliary fluid is introduced into the upflowing supercritical water reactor such that the fluid in the lower portion of the upflowing reactor is maintained in a turbulent fluid flow regime.

10. The method of claim 1 where the aromatic hydrocarbons consist essentially of toluene.

11. The method of claim 1 where the auxiliary feedstock further comprises a catalytic material, where the catalytic material is present in a range of from about 100 ppm wt. % to about 1 wt. % of the auxiliary feedstock and consists of one to five active metals selected from the group consisting of iron, nickel, vanadium, molybdenum, chromium, manganese, cobalt, copper, zinc, tungsten, zirconium and titanium.

12. The method of claim 1 where the auxiliary feedstock further comprises a catalyst precursor, where the catalyst precursor is operable to convert into a catalytic material at the operating conditions of the upflowing supercritical water reactor, the catalyst precursor is present in a range of from about 100 ppm wt. % to about 1 wt. % of the auxiliary feedstock and consists of one to five active metals selected from the group consisting of iron, nickel, vanadium, molybdenum, chromium, manganese, cobalt, copper, zinc, tungsten, zirconium and titanium.

13. The method of claim 1 where the paraffinic sulfur is selected from the group consisting of thiol compounds having a carbon number in a range of from 1 to 8 and combinations thereof.

14. The method of claim 1 where the auxiliary feedstock comprises light hydrocarbons.

15. The method of claim 14 where the auxiliary feedstock also comprises paraffinic sulfur, where the paraffinic sulfur is present in a range of from 0.05 wt. % to about 1 wt. % of the auxiliary feedstock as calculated on a sulfur-only basis and is selected from the group consisting of thiol compounds having a carbon number in a range of from 1 to 8 and combinations thereof.

16. The method of claim 1 further comprising the steps of:
operating the supercritical water petroleum upgrading system such that the upflowing reactor product fluid is introduced into an upper portion of a downflowing supercritical water reactor;
operating the downflowing supercritical water reactor such that a fluid contained in the downflowing reactor is maintained at a temperature and a pressure equal to or greater than the critical temperature and the critical pressure of water, respectively, and is moving in a generally downward direction; and
operating the supercritical water petroleum upgrading system such that a downflowing reactor product fluid passes from a lower portion of the downflowing supercritical water reactor,
where the amount of passing downflowing reactor product fluid is equivalent to the amount of introduced upflowing reactor product fluid;
where the step of operating the supercritical water petroleum upgrading system is such that the gas-phase hydrocarbon product, the upgraded and desulfurized petroleum product and the aqueous-phase product are produced through the separate selective separation of the downflowing reactor product fluid instead of the upflowing reactor product fluid; and
where the supercritical water petroleum upgrading system also includes the downflowing supercritical water reactor, where the downflowing reactor is fluidly coupled downstream of the upflowing supercritical water reactor and is operable to receive the upflowing reactor product fluid into the upper portion of the downflowing reactor.

17. The method of claim 16 further comprising the step of operating the downflowing supercritical water reactor such that the temperature of the fluid contained in the downflowing reactor is maintained at a temperature in a range of from about 0° C. to about 100° C. greater than the temperature of the fluid contained in the upflowing reactor.

18. The method of claim 1 further comprising the step of operating the supercritical water petroleum upgrading system such that the yield between the introduced petroleum feedstock and the upgraded and desulfurized petroleum product is equal to or greater than about 92 percent by weight.

19. The method of claim 1 further comprising the step of operating the supercritical water petroleum upgrading system such that the difference in API gravity between the upgraded and desulfurized petroleum product and the introduced petroleum feedstock is equal to or greater than about 8 degrees.

20. The method of claim 1 further comprising the step of operating the supercritical water petroleum upgrading system such that such that the upgraded and desulfurized petroleum product has less than about 3 wt. % insoluble material.

21. A method for upgrading a petroleum feedstock using a supercritical water petroleum upgrading system, the method comprising the steps of:
introducing the petroleum feedstock into the supercritical water petroleum upgrading system;
introducing a water into the supercritical water petroleum upgrading system;
introducing an auxiliary feedstock into the supercritical water petroleum upgrading system, where the auxiliary feedstock comprises light hydrocarbon;
operating the supercritical water petroleum upgrading system such that the petroleum feedstock and the water combine to form a mixed petroleum feedstock;
operating the supercritical water petroleum upgrading system such that the mixed petroleum feedstock and the auxiliary feedstock are introduced separately and simultaneously into a lower portion of an upflowing supercritical water reactor, where the auxiliary feedstock is introduced into the upflowing reactor such that a portion of a fluid contained within the upflowing reactor located proximate to the bottom of the upflowing reactor does not lack fluid momentum;

operating the upflowing supercritical water reactor such that the fluid contained within the upflowing reactor is maintained at a temperature equal to or greater than about the critical temperature of water, at a pressure equal to or greater than about the critical pressure of water, and is moving in a generally upwards direction, such that supercritical water forms from the introduced water in the fluid contained within the upflowing reactor;

operating the upflowing supercritical water reactor such that the upgraded and desulfurized petroleum product forms as the reaction product between the introduced petroleum feedstock and the supercritical water in the fluid contained within the upflowing reactor;

operating the supercritical water petroleum upgrading system such that an upflowing reactor product fluid passes from an upper portion of the upflowing reactor, where the product fluid comprises the upgraded and desulfurized petroleum product, and where the amount of passing upflowing reactor product fluid is equivalent to the combined amount of the introduced mixed petroleum feedstock and the auxiliary feedstock; and operating the supercritical water petroleum upgrading system such that a gas-phase hydrocarbon product, the upgraded and desulfurized petroleum product and an aqueous-phase product are separately selectively separated from the upflowing reactor product fluid.

22. The method of claim 21 where the petroleum feedstock and the water are introduced such that a volumetric flow ratio of introduced water to introduced petroleum feedstock is maintained in a range of from about 10:1 to about 1:10 at standard conditions.

23. The method of claim 21 further comprising the step of operating the supercritical water petroleum upgrading system such that the petroleum feedstock combined into the mixed petroleum feedstock has a temperature no greater than about 150° C. and a pressure equal to or greater than about the critical pressure of water.

24. The method of claim 21 further comprising the step of operating the supercritical water petroleum upgrading system such that a volumetric flow ratio of the auxiliary feedstock to the mixed petroleum feedstock at ambient temperature and at respective pressure conditions is in a range of from about 2:1 to about 1:1000 at standard conditions.

25. The method of claim 21 further comprising the step of operating the supercritical water petroleum upgrading system such that a temperature difference between the auxiliary feedstock and the mixed petroleum feedstock is maintained in a range of from about −50° C. to about 250° C.

26. The method of claim 21 further comprising the step of operating the upflowing supercritical water reactor such that the temperature of the fluid within in the upflowing reactor is maintained in a range of from about 380° C. to about 600° C.

27. The method of claim 21 further comprising the step of operating the supercritical water petroleum upgrading system such that the temperature difference between the upflowing reactor product fluid and the mixed petroleum feedstock is maintained in a range of from about 50° C. to about 300° C. and the pressure of the upflowing reactor product fluid is maintained in a range of from about 3,200 psig to about 6,000 psig.

28. The method of claim 21 where the auxiliary fluid is introduced into the upflowing supercritical water reactor such that the auxiliary fluid has a greater upward fluid velocity than the average superficial velocity of fluid in the reactor.

29. The method of claim 21 where the auxiliary fluid is introduced into the upflowing supercritical water reactor such that the fluid in the lower portion of the upflowing reactor is maintained in a turbulent fluid flow regime.

30. The method of claim 21 where the auxiliary feedstock further comprises supercritical water.

31. The method of claim 30 where the auxiliary feedstock further comprises aromatic hydrocarbons, where the aromatic hydrocarbons are present in a range of from about 1 weight percent (wt. %) to about 75 wt. % of the auxiliary feedstock.

32. The method of claim 31 where the aromatic hydrocarbons consist essentially of toluene.

33. The method of claim 31 where the auxiliary feedstock further comprises a catalytic material, where the catalytic material is present in a range of from about 100 ppm wt. % to about 1 wt. % of the auxiliary feedstock and consists of one to five active metals selected from the group consisting of iron, nickel, vanadium, molybdenum, chromium, manganese, cobalt, copper, zinc, tungsten, zirconium and titanium.

34. The method of claim 31 where the auxiliary feedstock further comprises a catalyst precursor, where the catalyst precursor is operable to convert into a catalytic material at the operating conditions of the upflowing supercritical water reactor, the catalyst precursor is present in a range of from about 100 ppm wt. % to about 1 wt. % of the auxiliary feedstock and consists of one to five active metals selected from the group consisting of iron, nickel, vanadium, molybdenum, chromium, manganese, cobalt, copper, zinc, tungsten, zirconium and titanium.

35. The method of claim 31 where the auxiliary feedstock also comprises paraffinic sulfur, where the paraffinic sulfur is present in a range of from 0.05 wt. % to about 1 wt. % of the auxiliary feedstock as calculated on a sulfur-only basis.

36. The method of claim 35 where the paraffinic sulfur is selected from the group consisting of thiol compounds having a carbon number in a range of from 1 to 8 and combinations thereof.

37. The method of claim 21 where the auxiliary feedstock also comprises paraffinic sulfur, where the paraffinic sulfur is present in a range of from 0.05 wt. % to about 1 wt. % of the auxiliary feedstock as calculated on a sulfur-only basis and is selected from the group consisting of thiol compounds having a carbon number in a range of from 1 to 8 and combinations thereof.

38. The method of claim 21 further comprising the steps of:

operating the supercritical water petroleum upgrading system such that the upflowing reactor product fluid is introduced into an upper portion of a downflowing supercritical water reactor;

operating the downflowing supercritical water reactor such that a fluid contained in the downflowing reactor is maintained at a temperature and a pressure equal to or greater than the critical temperature and the critical pressure of water, respectively, and is moving in a generally downward direction; and operating the supercritical water petroleum upgrading system such that a downflowing reactor product fluid passes from a lower portion of the downflowing supercritical water reactor, where the amount of passing downflowing reactor product fluid is equivalent to the amount of introduced upflowing reactor product fluid;

where the step of operating the supercritical water petroleum upgrading system is such that the gas-phase hydrocarbon product, the upgraded and desulfurized petroleum product and the aqueous-phase product are produced through the separate selective separation of the downflowing reactor product fluid instead of the upflowing reactor product fluid; and where the supercritical water petroleum upgrading system also includes the downflowing supercritical water reactor, where the downflowing reactor is fluidly coupled downstream of the upflowing supercritical water reactor and is operable to receive the upflowing reactor product fluid into the upper portion of the downflowing reactor.

39. The method of claim 38 further comprising the step of operating the downflowing supercritical water reactor such that the temperature of the fluid contained in the downflowing reactor is maintained at a temperature in a range of from about 0° C. to about 100° C. greater than the temperature of the fluid contained in the upflowing reactor.

40. The method of claim 21 further comprising the step of operating the supercritical water petroleum upgrading system such that the yield between the introduced petroleum feedstock and the upgraded and desulfurized petroleum product is equal to or greater than about 92 percent by weight.

41. The method of claim 21 further comprising the step of operating the supercritical water petroleum upgrading system such that the difference in API gravity between the upgraded and desulfurized petroleum product and the introduced petroleum feedstock is equal to or greater than about 8 degrees.

42. The method of claim 21 further comprising the step of operating the supercritical water petroleum upgrading system such that such that the upgraded and desulfurized petroleum product has less than about 3 wt. % insoluble material.

43. A method for upgrading a petroleum feedstock using a supercritical water petroleum upgrading system, the method comprising the steps of:

introducing the petroleum feedstock into the supercritical water petroleum upgrading system;

introducing a water into the supercritical water petroleum upgrading system;

introducing an auxiliary feedstock into the supercritical water petroleum upgrading system;

operating the supercritical water petroleum upgrading system such that the petroleum feedstock and the water combine to form a mixed petroleum feedstock;

operating the supercritical water petroleum upgrading system such that the mixed petroleum feedstock and the auxiliary feedstock are introduced separately and simultaneously into a lower portion of an upflowing supercritical water reactor, where the auxiliary feedstock is introduced into the upflowing reactor such that a portion of a fluid contained within the upflowing reactor located proximate to the bottom of the upflowing reactor does not lack fluid momentum;

operating the upflowing supercritical water reactor such that the fluid contained within the upflowing reactor is maintained at a temperature equal to or greater than about the critical temperature of water, at a pressure equal to or greater than about the critical pressure of water, and is moving in a generally upwards direction, such that supercritical water forms from the introduced water in the fluid contained within the upflowing reactor;

operating the upflowing supercritical water reactor such that the upgraded and desulfurized petroleum product forms as the reaction product between the introduced petroleum feedstock and the supercritical water in the fluid contained within the upflowing reactor;

operating the supercritical water petroleum upgrading system such that an upflowing reactor product fluid passes from an upper portion of the upflowing reactor, where the product fluid comprises the upgraded and desulfurized petroleum product, and where the amount of passing upflowing reactor product fluid is equivalent to the combined amount of the introduced mixed petroleum feedstock and the auxiliary feedstock; and operating the supercritical water petroleum upgrading system such that a gas-phase hydrocarbon product, the upgraded and desulfurized petroleum product and an aqueous-phase product are separately selectively separated from the upflowing reactor product fluid, operating the supercritical water petroleum upgrading system such that the upflowing reactor product fluid is introduced into an upper portion of a downflowing supercritical water reactor;

operating the downflowing supercritical water reactor such that a fluid contained in the downflowing reactor is maintained at a temperature and a pressure equal to or greater than the critical temperature and the critical pressure of water, respectively, and is moving in a generally downward direction; and operating the supercritical water petroleum upgrading system such that a downflowing reactor product fluid passes from a lower portion of the downflowing supercritical water reactor, where the amount of passing downflowing reactor product fluid is equivalent to the amount of introduced upflowing reactor product fluid;

where the step of operating the supercritical water petroleum upgrading system is such that the gas-phase hydrocarbon product, the upgraded and desulfurized petroleum product and the aqueous-phase product are produced through the separate selective separation of the downflowing reactor product fluid instead of the upflowing reactor product fluid; and where the supercritical water petroleum upgrading system also includes the downflowing supercritical water reactor, where the downflowing reactor is fluidly coupled downstream of the upflowing supercritical water reactor and is operable to receive the upflowing reactor product fluid into the upper portion of the downflowing reactor.

44. The method of claim 43 where the petroleum feedstock and the water are introduced such that a volumetric flow ratio of introduced water to introduced petroleum feedstock is maintained in a range of from about 10:1 to about 1:10 at standard conditions.

45. The method of claim 43 further comprising the step of operating the supercritical water petroleum upgrading system such that the petroleum feedstock combined into the mixed petroleum feedstock has a temperature no greater than about 150° C. and a pressure equal to or greater than about the critical pressure of water.

46. The method of claim 43 further comprising the step of operating the supercritical water petroleum upgrading system such that a volumetric flow ratio of the auxiliary feedstock to the mixed petroleum feedstock at ambient temperature and at respective pressure conditions is in a range of from about 2:1 to about 1:1000 at standard conditions.

47. The method of claim 43 further comprising the step of operating the supercritical water petroleum upgrading system such that a temperature difference between the auxiliary feedstock and the mixed petroleum feedstock is maintained in a range of from about −50° C. to about 250° C.

48. The method of claim 43 further comprising the step of operating the upflowing supercritical water reactor such that the temperature of the fluid within in the upflowing reactor is maintained in a range of from about 380° C. to about 600° C.

49. The method of claim 43 further comprising the step of operating the supercritical water petroleum upgrading system such that the temperature difference between the upflowing reactor product fluid and the mixed petroleum feedstock is maintained in a range of from about 50° C. to about 300° C. and the pressure of the upflowing reactor product fluid is maintained in a range of from about 3,200 psig to about 6,000 psig.

50. The method of claim 43 where the auxiliary fluid is introduced into the upflowing supercritical water reactor such that the auxiliary fluid has a greater upward fluid velocity than the average superficial velocity of fluid in the reactor.

51. The method of claim 43 where the auxiliary fluid is introduced into the upflowing supercritical water reactor such that the fluid in the lower portion of the upflowing reactor is maintained in a turbulent fluid flow regime.

52. The method of claim 43 where the auxiliary feedstock comprises supercritical water.

53. The method of claim 52 where the auxiliary feedstock further comprises aromatic hydrocarbons, where the aromatic hydrocarbons are present in a range of from about 1 weight percent (wt. %) to about 75 wt. % of the auxiliary feedstock.

54. The method of claim 53 where the aromatic hydrocarbons consist essentially of toluene.

55. The method of claim 53 where the auxiliary feedstock further comprises a catalytic material, where the catalytic material is present in a range of from about 100 ppm wt. % to about 1 wt. % of the auxiliary feedstock and consists of one to five active metals selected from the group consisting of iron, nickel, vanadium, molybdenum, chromium, manganese, cobalt, copper, zinc, tungsten, zirconium and titanium.

56. The method of claim 53 where the auxiliary feedstock further comprises a catalyst precursor, where the catalyst precursor is operable to convert into a catalytic material at the operating conditions of the upflowing supercritical water reactor, the catalyst precursor is present in a range of from about 100 ppm wt. % to about 1 wt. % of the auxiliary feedstock and consists of one to five active metals selected from the group consisting of iron, nickel, vanadium, molybdenum, chromium, manganese, cobalt, copper, zinc, tungsten, zirconium and titanium.

57. The method of claim 53 where the auxiliary feedstock also comprises paraffinic sulfur, where the paraffinic sulfur is present in a range of from 0.05 wt. % to about 1 wt. % of the auxiliary feedstock as calculated on a sulfur-only basis.

58. The method of claim 57 where the paraffinic sulfur is selected from the group consisting of thiol compounds having a carbon number in a range of from 1 to 8 and combinations thereof.

59. The method of claim 43 where the auxiliary feedstock comprises light hydrocarbons.

60. The method of claim 59 where the auxiliary feedstock also comprises paraffinic sulfur, where the paraffinic sulfur is present in a range of from 0.05 wt. % to about 1 wt. % of the auxiliary feedstock as calculated on a sulfur-only basis and is selected from the group consisting of thiol compounds having a carbon number in a range of from 1 to 8 and combinations thereof.

61. The method of claim 43 further comprising the step of operating the downflowing supercritical water reactor such that the temperature of the fluid contained in the downflowing reactor is maintained at a temperature in a range of from about 0° C. to about 100° C. greater than the temperature of the fluid contained in the upflowing reactor.

62. The method of claim 43 further comprising the step of operating the supercritical water petroleum upgrading system such that the yield between the introduced petroleum feedstock and the upgraded and desulfurized petroleum product is equal to or greater than about 92 percent by weight.

63. The method of claim 43 further comprising the step of operating the supercritical water petroleum upgrading system such that the difference in API gravity between the upgraded and desulfurized petroleum product and the introduced petroleum feedstock is equal to or greater than about 8 degrees.

64. The method of claim 43 further comprising the step of operating the supercritical water petroleum upgrading system such that such that the upgraded and desulfurized petroleum product has less than about 3 wt. % insoluble material.

* * * * *